United States Patent [19]

Gruhl

[11] Patent Number: 5,034,739
[45] Date of Patent: Jul. 23, 1991

[54] COMPUTER-CONTROLLED CHECKING SYSTEM FOR PARKING HOUSES GARAGES OR PARKING LOTS

[76] Inventor: Hartmut Gruhl, Leyboldstrasse 14, Cologne, Fed. Rep. of Germany

[21] Appl. No.: 299,833
[22] PCT Filed: Apr. 28, 1988
[86] PCT No.: PCT/EP88/00359
 § 371 Date: Jul. 26, 1989
 § 102(e) Date: Jul. 26, 1989
[87] PCT Pub. No.: WO88/80910
 PCT Pub. Date: Nov. 17, 1988

[30] Foreign Application Priority Data

May 8, 1987 [DE] Fed. Rep. of Germany ....... 3715314

[51] Int. Cl.$^5$ ............................................. B60Q 1/48
[52] U.S. Cl. ................................. 340/932.2; 364/467
[58] Field of Search .................... 340/932.2, 937, 928; 382/1; 364/467

[56] References Cited

U.S. PATENT DOCUMENTS 4,603,390 7/1986 Mehdipour et al. ............. 340/932.2
4,665,395 5/1987 Van Ness ........................ 340/932.2
4,817,166 3/1989 Gonzalez et al. ..................... 382/60

Primary Examiner—Joseph A. Orsino
Assistant Examiner—Jeffery A. Hofass
Attorney, Agent, or Firm—Michael J. Striker

[57] ABSTRACT

A computer-controlled checking system for parking houses, garages, or parking lots. A computer for storing the license number of an entering vehicle calculating a parking fee to be paid and for clearing respective license numbers after payment of respective parking fees. A first video camera for taking a license number of the entering vehicle, and a first character reader for storing the license number of the entering vehicle and the entrance time in the computer. An automatic charging device for comparing the time of entrance of the vehicle with a charge settlement time, for displaying parking fee to be paid, and for thereafter emitting a code for opening the exit barrier. A second video camera for taking a license number of a leaving vehicle, and a second character reader for comparing the license number of the leaving vehicle with the license number stored in the computer as cleared, and for opening the exit barrier upon identifying the license number of the leaving vehicle with one of the cleared license numbers.

13 Claims, 1 Drawing Sheet

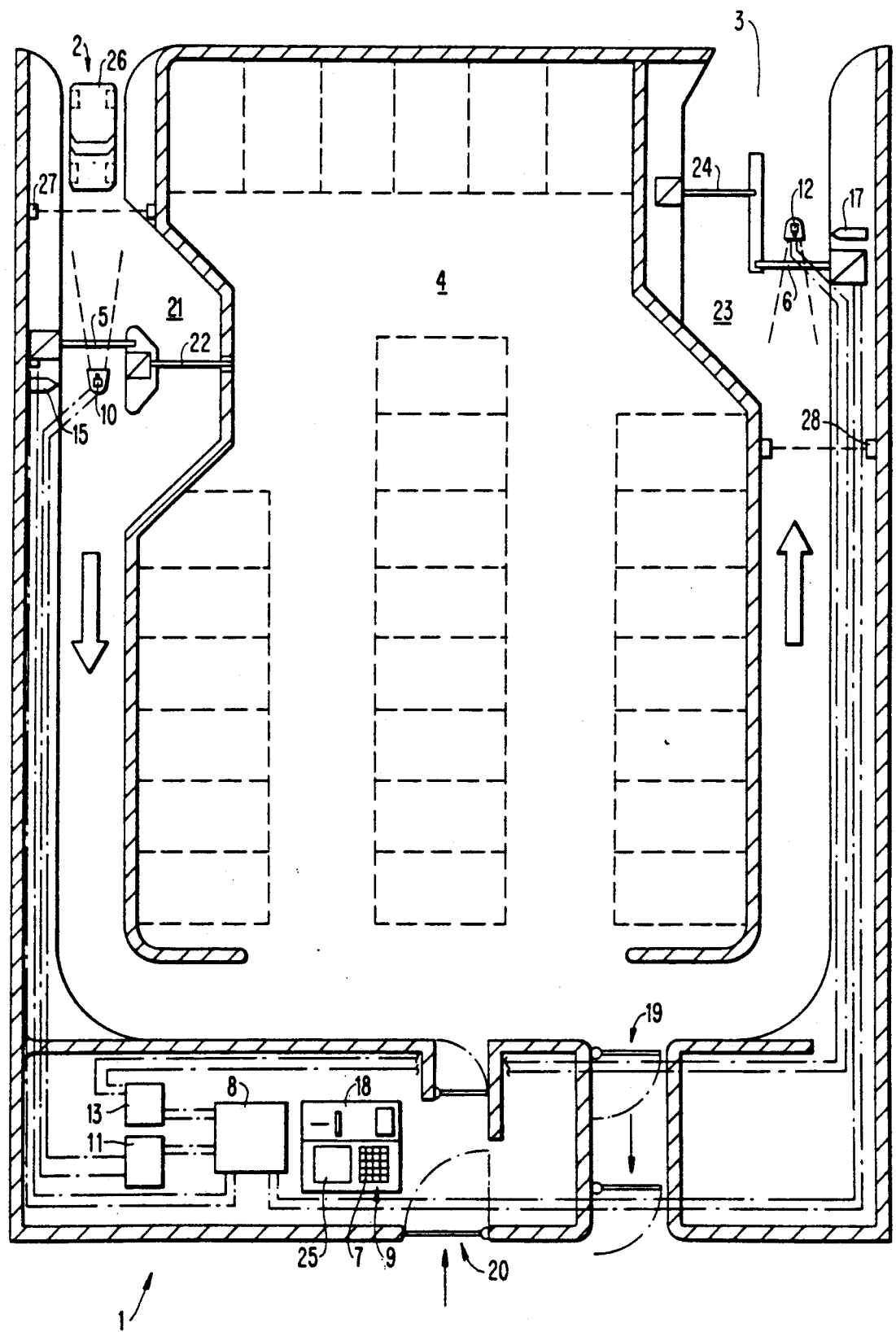

COMPUTER-CONTROLLED CHECKING SYSTEM FOR PARKING HOUSES, GARAGES OR PARKING LOTS

BACKGROUND OF THE INVENTION

The invention relates from a computer-controlled checking or clearance system for parking houses garages or parking lots. A known computer controlled checking or clearance system comprises an entrance at which means is disposed which registers time of entrance of a vehicle, an exit which can be blocked by a barrier which can be opened by a code for opening the barrier and, an automatic charging device which by comparing of the time of entrance with the charge settlement time calculates and displays the parking fee to be paid and, after payment of the displayed parking free, emits a code with the aid of which the barrier at the exit can be opened for a predetermined period of time for example, 10 minutes.

The known clearance or checking systems of this type have which can be picked up by the driver of the entering vehicle at the entrance by pressing a button of a parking ticket dispensing device and on which the time of entering is recorded. By inserting this parking ticket into an automatic charging device the parking fee to be paid is calculated and displayed and after payment of the displayed parking fee, the parking ticket is cleared for opening of the barrier at the exit. At the exit the parking ticket or a card dispensed by the automatic charging device must be inserted into means which effects opening of the exit barrier. This clearance system has the disadvantage that the parking ticket issued at the entrance can be lost and that at the exit, the parking ticket cleared for leaving or a corresponding card is not held ready by the driver of the leaving vehicle and must, therefore, first be found in pockets of clothings or in a compartment of the vehicle before the cleared parking ticket or the corresponding card can be inserted into the device for opening the exit barrier. A further disadvantage of the known checking system resides in that for picking up the parking ticket the entering vehicle must be stopped exactly at the level of the device issuing the parking ticket and a side window must be opened to enable the parking ticket to be picked up. At the exit as well, it is necessary to stop the leaving vehicle immediately adjacent the means effecting the opening of the exit barriers and open the side window so that the parking ticket or the corresponding card can be inserted into the device for opening the barrier. These actions require a certain physical and driving skill which elderly people or disabled persons frequently do not have.

SUMMARY OF THE INVENTION

The object of the invention is to provide a computer-controlled clearing or checking system in which the disadvantages of the known checking systems are avoided and in which traffic jams at the exit and entrance of a parking garage or a parking lot are largely avoided.

The object of the invention is achieved by a checking system which includes means registering the entrance of a vehicle and comprising a video camera, in particular a CCD camera, taking the license number of an entering vehicle, and a character reader which stores the license number and the entrance time in a computer an automatic charging device having a keyboard with the aid of which license numbers can be entered and which cooperates with the computer in such a manner that on entering a license number stored in the computer, the parking fee to be paid is calculated and displayed and) after payment of said fee, the respective license number is stored as cleared; the means effecting opening of the barrier in the exit comprising a video camera, in particular CCD camera, taking the license number of a leaving vehicle)and a character reader which compares the license number of the leaving vehicle with license numbers stored as cleared and on identity with one of said license number, initiates opening of the barrier.

On entrance of a vehicle looking for a parking space, the vehicle number is automatically detected and stored together with the entrance time in a computer. The driver of the entering vehicle can now park his vehicle at a free space of the parking house or garage or parking lot and leave the garage or lot.

On picking-up the vehicle, the driver thereof first has to go to an automatic charging device or cash register device. There he must enter his license number through a keyboard. The fee to be paid is then displayed on a screen or other visual display device. After paying the fee displayed, the driver can go to his vehicle and readily pass the exit because the video camera installed therein on recognition of the license number cleared by the computer, automatically opens the exit barrier.

Conveniently, a barrier is also arranged at the entrance which opens automatically as soon as the video camera installed therein in conjunction with the character reader has detected the license number of the entering vehicle to be identifiable and stored in the computer. If the license plate of the entering vehicle is soiled to such an extent that the license number cannot be stored in a manner to enable it to be identified by the camera at the exit, the barrier at the entrance remains closed and a to a special lane whereby issue of a parking ticket settlement of the parking fee can be made in the usual manner. Preferably, at the exit as well, a special lane is provided for the case that the license number of the leaving vehicle cannot be identified or the parking fee has not yet been paid.

The present invention both as to its construction so to its method of operation, together with additional objects and advantages thereof, will be best understood from the following description of the preferred embodiment with reference to the appended drawings.

BRIEF DESCRIPTION OF THE DRAWINGS

A single FIGURE schematically shows a parking garage with a checking system according to the present invention.

At an entrance 2 of a parking garage 1 a video camera 10, in particular a CCD camera is arranged. The video camera 10 takes the license number of an entering vehicle and passes a respective shot or several shots to a character reader 11 which analyzes the shot and stores it together with the entrance time as digital information in a computer 8. Simultaneously with the storage of this information, the barrier 5 at the entrance 2 is given the order to open. Since the taking, analyzing and storing of the license number takes place almost without any inertia the barrier 5 opens before the entering vehicle has reached the barrier. It is therefore not necessary here for the vehicle to stop before the barrier 5 opens.

When the driver of the entered vehicle has parked his vehicle on the parking area 4, he can leave the parking garage 1 through a user exit 19. At a user entrance 20, an automatic charging device or cash register means 7 is disposed which is provided with a keyboard 9 with the of which license numbers can be entered. When the driver picks up his vehicle, he enters the license number thereof via the keyboard 9. On the screen 25 the parking fee to be paid is then displayed. After payment of the parking fee, the receipt dispensing unit 18 issues a receipt on which the license number, the parking fee and a date are printed.

The driver can now go to his vehicle and drive to the exit 3. At the latter a video camera 12 is installed which in conjunction with the character reader 13 takes the license number of the leaving vehicle and identifies the number. Since after payment of the parking fee the license number is stored as cleared in the computer 8 an exit barrier 6 opens as soon as the license number is identified. This normally happens before the leaving vehicle has to stop at the barrier 6.

At the entrance 2 a special lane 21 is arranged having a barrier 22. Furthermore, at the entrance there is also a direction signal 15 which points towards the special lane 21 as soon as the character reader 11 reports the license number of the entering vehicle to be unidentifable. At the exit 3, a special lane 23 and a barrier 24 may also be provided for the case that the license number of a leaving vehicle cannot be identified. Here as well a direction signal may be provided which points to the special lane 23 when the character reader 13 reports the license number of the leaving vehicle to be unidentifiable.

For vehicles which, for example, by payment of a monthly rental have a parking authorization, therefore making settlement of the payment via the automatic charging device 7 unnecessary, via the keyboard 9 and a special key or command, license numbers can be stored as clear in the computer 8. This means that the drivers of vehicles with parking authorization can enter and leave the parking garage 1 at any time.

In accordance with data protection, the system is connected so that after opening of the barrier 6 in the exit 3 the data of the leaving vehicle stored in the computer are erased.

Preferably, the video camera at the entrance and the video camera at the exit are each arranged in the center of the drive lane on the ground substantially in the region of the entrance barrier 5 and the exit barrier 6, respectively. The camera can be arranged protected beneath a dish-shaped housing which is open only in the direction of the entering or leaving vehicle. To be independent from varying light conditions, it may be expedient to arrange within the dish-shaped housing a projection light which illuminates the number plates of the entering or leaving vehicles. In the entrance 2 a few meters in front of the barrier 5 or the video camera 10 a sensor 27, for example a light barrier, may be arranged which, when a vehicle enters, sets the video camera 10 and the character reader 11 cooperating therewith in operation. Via a time relay after one or two seconds, switched off again. With the aid of this sensor 27 it is also possible, if necessary, to switch on a projection light for a certain time. A sensor 28 acting in similar manner may also be arranged in the exit.

While the invention has been illustrated and described with reference to a specific embodiment of a computer-controlled checking system for parking houses, garages, or lots, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A computer-controlled checking system for parking houses, garages, or parking lots, said computer-controlled checking system comprising an entrance having an entrance barrier;

an exit having an exit barrier;

a computer for storing license numbers of entering vehicles for calculating parking fees to be paid, for clearing respective license numbers after payment of respective parking fees, and for storing cleared license numbers;

means located at the entrance for registering entrance of a vehicle and including a first video camera for taking a license number of the entering vehicle, and a first character reader for storing the license number and the entrance time in the computer and for opening the entrance barrier in response to storing the license number of the entering vehicle in the computer;

an automatic charging device for comparing the time of entrance of the vehicle with a charge settlement time, displaying parking fee to be paid, and for emitting a code for opening the exit barrier for a predetermined period of time upon payment of the parking fee, said automatic charging device including a keyboard for entering the license number;

means for opening the exit barrier in response to emission of said opening code, said opening means comprising a second video camera for taking a license number of a leaving vehicle, and a second character reader for comparing the license number of the leaving vehicle with the license numbers stored as clear in the computer, and for opening the exit barrier upon identifying the license number of the leaving vehicle with one of said cleared license numbers.

2. A system according to claim 1 wherein said first and second character readers are formed, respectively, to open said entrance and exit barriers, respectively, as soon as the license numbers of the entering and leaving vehicles, respectively, are stored and cleared, respectively, in said computer.

3. A system according to claim 1 further comprising a first lane located at said entrance and a directional signal pointing to said first lane and actuatable upon the first character reader reporting the license number of the entering vehicle as unidentifiable.

4. A system according to claim 1 further comprising a second lane and a second directional signal pointing to said second lane and actuatable upon the second character reader reporting the license number of the leaving vehicle as uncleared.

5. A system according to claim 1 wherein said automatic charging device comprises means for storing in the computer a parking authorization which allows a predetermined license number to be stored as permanently cleared.

6. A system according to claim 1 wherein said automatic charging device comprises a receipt dispensing unit for emitting a receipt provided with a date, license number and parking fee in response to payment of the parking feed.

7. A system according to claim 1 wherein said computer comprises means for erasing the license number of the leaving vehicle after opening of the exit barrier.

8. A system according to claim 1 wherein said entrance and said exit each have a drive lane having a center, and said first and second video cameras being each arranged in the center of the respective drive lane on the ground substantially at the respective barrier.

9. A system according to claim 8 further comprising first and second disc-shaped protective housing each having an open side facing entering and leaving vehicles respectively, said first and second video cameras being arranged beneath said protective housings, respectively.

10. A system according to claim 1 wherein each of said first and second video cameras is a CCD camera.

11. A checking system according to claim 1 further comprising a first sensor and a second sensor located at the entrance and the exit, respectively for actuating said first and second video cameras in a predetermined time.

12. A checking system according to claim 11 wherein each of said first and second sensors is a light barrier.

13. A computer-controlled checking system for parking houses, garages, or parking lots having an entrance with an entrance barrier and an exit with an exit barrier, said computer-controlled checking system comprising a computer for storing license numbers of entering vehicles, for calculating parking fees to be paid, for clearing respective license numbers after payment of respective parking fees, and for storing cleared license numbers;

means located at the entrance for registering entry of a vehicle and including a first video camera for taking a license number of the entering vehicle, and a first character reader for storing the license number and the entrance time of the entering vehicle in the computer;

an automatic charging device for comparing the time of entrance of the vehicle with a charge settlement time, for displaying parking fee to be paid, and for thereafter emitting a code for opening the exit barrier for a predetermined period of time, said automatic charging device comprising a keyboard for entering the license number into the computer and;

means for opening the exit barrier after payment of the parking fee, said opening means comprising a second video camera for taking a license number of a leaving vehicle, and a second character reader for comparing the license number of the leaving vehicle with the license numbers stored in the computer as cleared and for opening the exit barrier upon identifying the license number of the leaving vehicle with one of said cleared license numbers.

* * * * *